G. MOORE.
Plow Moldboard.
No. 68,102. Patented Aug. 27. 1867
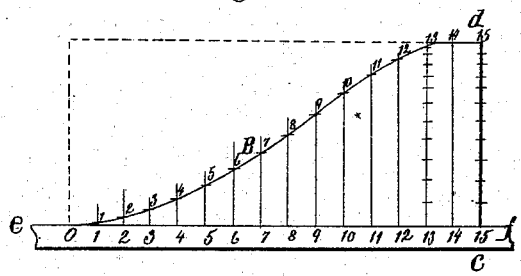
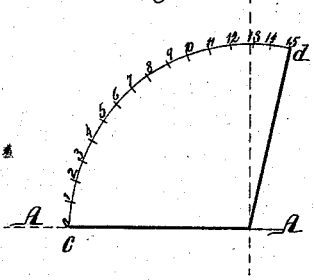
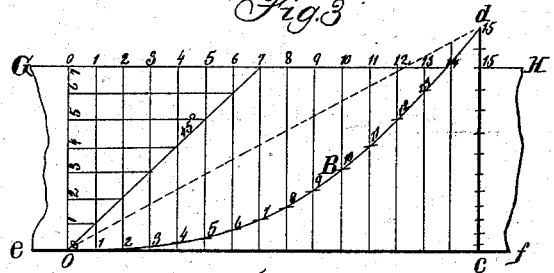
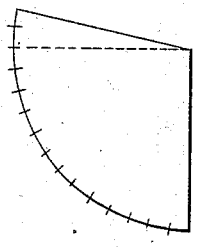
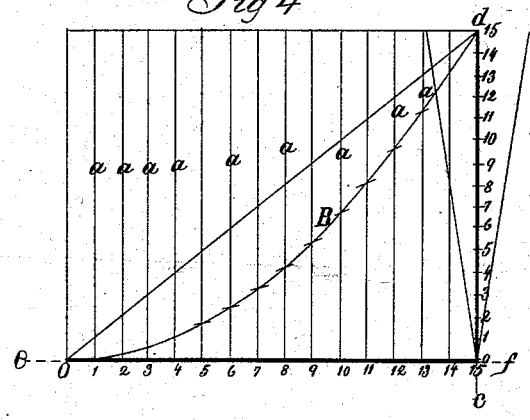
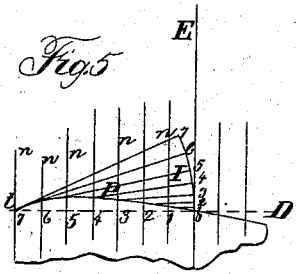
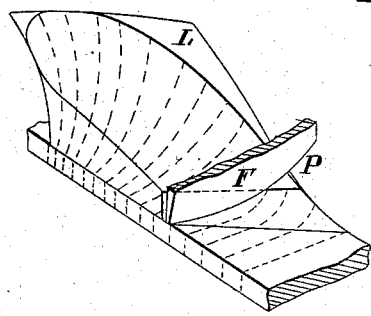
Witnesses.
Henry R. Walton
M. Clyde Sullivan
Inventor
Gilpin Moore
by Dodge & Munn
his Attys

United States Patent Office.

GILPIN MOORE, OF MOLINE, ILLINOIS, ASSIGNOR TO HIMSELF AND DEERE AND COMPANY, OF THE SAME PLACE.

Letters Patent No. 68,102, dated August 27, 1867.

IMPROVEMENT IN PLOUGHS.

*The Schedule referred to in these Letters Patent and making part of the same.*

TO ALL WHOM IT MAY CONCERN:

Be it known that I, GILPIN MOORE, of Moline, in the county of Rock Island, and State of Illinois, have invented certain new and useful Improvements in Ploughs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

My invention consists in a novel method of constructing ploughs, whereby the mould-board is given a peculiar form, and whereby ploughs of various sizes may be made of perfect uniformity as to the shape or form of mould-board. It is well known that the alluvial and prairie soils of the West are very adhesive in their nature, and that for this reason ploughs for use there are made of steel instead of cast iron. It is also well known that it is very difficult to so form or shape the mould-boards of these steel ploughs that they will scour and wear uniformly over their entire surface, and that hitherto there has been no settled or fixed plan or rule by which this object can be accomplished. To remedy these difficulties is the object of my present invention, and I propose to remedy them by so forming the outer surface of the mould-board that it shall correspond in form transversely with the form which the under surface of the furrow-slice will have assumed at the instant it is cut loose from the ground across its entire width, and continuing that form of surface transversely from front to rear of the mould-board, so that the friction of the furrow-slice on the mould-board, and the consequent wear of the latter, shall be uniform throughout, and the furrow-slice be turned over by the mould-board without alteration of its under surface in form after it is once cut loose from the ground. It will readily be seen that the convexity of the under surface of the furrow-slice is determined by the angle of the cutting edge of the share to the land-side, in connection with the inclination or angle of the cutting edge of the land-side or shin to the bottom of the plough, and that hence the form of the mould-board made on my plan will be regulated by these two angles, which may be arbitrarily fixed to suit the taste and wishes of the constructor. In practice, I find that forty-five degrees affords a good angle for the edge of the share, as represented in Figure 3.

To construct a plough on my plan, I take a block of wood of the width and length that it is desired to have the plough, and strike on its rear end the arc of a circle, having a radius equal in length to the width of the block, as represented in Figure 2, and then form the block circular to correspond with this circle or curve throughout its entire length, the block, in other words, then forming the one-quarter of a cylinder of double the diameter that the block is wide. In order to have an "overlap" to the mould-board, that is, to have its rear end extend over beyond the base line of the plough, the arc formed by the line $c\,d$ of fig. 2 is extended a short distance beyond the perpendicular, as represented, this being optional with the builder, according as he may or may not desire to give an "overlap" to the plough, though it is usually preferred, as it insures the more perfect turning of the furrow-slice. In order to determine the upper line of the mould-board, as represented by B in figs. 1 and 3, I proceed to form a templet or pattern, as shown in Figure 4. I construct a diagram, having its base line $e-f$ equal to the length of the plough, and having its perpendicular $c-d$ equal to the length of the curve $c-d$, fig. 2, and then divide these lines $e\,f$ and $c\,d$ into an equal number of divisions, which in this case number fifteen, and also draw perpendicular lines $a$, corresponding with the divisions on line $e\,f$. I then proceed to draw a series of lines from the various points indicated by the divisions on the perpendicular line $c\,d$ to the point $o$ on the line $e\,f$, and it will be found that a line drawn through the points where these diagonal lines intersect the perpendicular lines $a$ will form the curved line B, and on this line I cut the edge of my templet or pattern, as represented clearly in fig. 4; this templet being formed of sheet metal or other pliable material. Having thus formed my templet, I apply it to the curved surface of the block and bend it over the same, the lines $e\,f$ and $c\,d$ of the templet corresponding with the same lines on the block, as shown in figs. 1 and 3, the first being a side view and the latter a top plan view of the block. I then mark the line B, as indicated in figs. 1 and 3, this line thus determined forming the land-side and upper edge of the share and mould-board of the plough, the block being secured to a board which has the division lines $a$ extended from one edge to another transversely over the block, as shown in figs. 1 and 3, the divisions being the same as in fig. 4. It will be seen that with the share standing at an angle of forty-five degrees, as indicated in fig. 3, the plough as it is drawn forward will cut the furrow-slice entirely across at the division line marked 7 of fig. 3, and that as the point of the plough enters under the slice at the land-side first, that side will be elevated more and more as the plough advances, until, by the time it has advanced far enough to cut entirely across, the under surface of the furrow-slice will be formed into a convex shape transversely, its inner lower edge being raised to a height corresponding to the point where the line 7 intersects the line B of fig. 1, while its outer edge remains level with the bottom of the furrow, and thus the convexity of the under surface of the furrow-slice at the instant it is severed from the ground will always correspond with the line extending from the outer edge of the share across at right angles to the land-side, and this will be determined, as hereinbefore stated, by the angle of the cutting edge of the share, and of the line B from the point of the plough back to a point opposite the outer edge of the share. I then proceed to construct a gauge or pattern, F, with its lower edge corresponding with the convexity of the furrow-slice, as follows: I draw a horizontal line, D, and mark thereon seven divisions, corresponding in size with those on the line $e\,f$ of figs. 1, 3, and 4, they all being of uniform size, and draw lines $n$, indicating these divisions, perpendicular to the line D, terminating at the perpendicular line E, as shown in Figure 5. I then strike the arc of a circle, I, with a radius equal to the distance from $t$ to E, which will be equal to the width of the plough, $t$ being the centre of the circle, and the arc being extended to a height equal to the height of the point where the line 7 intersects the line B of fig. 1, which, as before explained, is the height to which the inner side of the furrow-slice is raised when cut across. This arc I then divide into seven spaces, corresponding in size with the heights on the perpendicular lines from 1 to 7 inclusive of fig. 1. I then draw lines from these division points on the arc I to the point $t$, and then from the curved line P along the points of intersection between these converging lines and the perpendicular lines $n$, which gives me the outline or edge P of the gauge F. I then cut away the block from the line B to the lower right-hand edge, and so form its surface convex, that the gauge F, when applied thereto at right angles to the land-side, as represented in Figure 6, will exactly fit the surface transversely from the front all the way to the rear, thus forming a mould-board of a uniformly concave surface throughout its entire length, and the concavity of which shall exactly correspond with the convexity of the furrow-slice, as before described. In order to bring the land-side edge of the mould-board to a perpendicular line throughout its length, a piece, L, is fitted on to the curved surface of the block so as to bring it out flush, as represented in fig. 6.

It will at once be seen that the curvature of the line B may be made more or less abrupt, and consequently the twist of the mould-board be more or less rapid, by throwing the line $c\,d$ forward or backward at its upper end, as indicated in red in fig. 4, and this may be done without changing the width of the plough, the concavity of the mould-board being made more or less, as may be desired, to suit the various soils and purposes to which it is adapted. By these means I am enabled to construct a plough, with a mould-board having throughout its length a form corresponding exactly with the form of the furrow-slice at the instant it is cut entirely across, or, in other words, with the form of the under surface of the furrow-slice, on a line at right angles with the land-side drawn across the plough at the heel of the share, and thus to produce a plough that will wear and scour evenly over its entire surface, and which will turn the furrow-slice without changing its form after it has been once severed from the earth.

Having thus described my invention, what I claim is—

1. The plan or method herein described of constructing the mould-board of ploughs.

2. A plough having its mould-board constructed of a form corresponding with the form of the under surface of the furrow-slice at the instant it is severed from the earth, substantially as described.

GILPIN MOORE.

Witnesses:
  W. C. DODGE,
  P. T. DODGE.